United States Patent [19]

Ohara et al.

[11] Patent Number: 5,411,997
[45] Date of Patent: May 2, 1995

[54] MUD MATERIAL USED FOR IRON TAP HOLE IN BLAST FURNACE

[75] Inventors: Kengo Ohara; Hirao Omori, both of Akashi; Osamu Michihiro, Kakogawa; Makoto Suga, Kakogawa; Kouji Shimomura, Kakogawa; Toshitake Okada, Kakogawa; Yuji Ochiai, Kakogawa, all of Japan

[73] Assignee: Shinagawa Rozai Kabushiki Kaisha, Akashi, Japan

[21] Appl. No.: 945,643

[22] PCT Filed: Mar. 5, 1992

[86] PCT No.: PCT/JP92/00264

§ 371 Date: Nov. 5, 1992

§ 102(e) Date: Nov. 5, 1992

[87] PCT Pub. No.: WO92/15537

PCT Pub. Date: Sep. 17, 1992

[30] Foreign Application Priority Data

Mar. 7, 1991 [JP] Japan ................................ 3-41865

[51] Int. Cl.[6] .............................................. B22C 1/22
[52] U.S. Cl. .................................... 523/145; 523/140; 524/437; 524/445
[58] Field of Search ................. 523/145, 140; 524/437, 524/445

[56] References Cited

U.S. PATENT DOCUMENTS 4,379,866  4/1983  Henry, Jr. et al. ................ 523/140

FOREIGN PATENT DOCUMENTS 52-92803   8/1977  Japan .
55-51767   4/1980  Japan .
62-197348  9/1987  Japan .

Primary Examiner—Paul R. Michl
Assistant Examiner—John J. Guarriello
Attorney, Agent, or Firm—Oblon, Spivak, McClelland, Maier, & Neustadt

[57] ABSTRACT

The object of the present invention is to develop an innovative mud material which has the properties of a resin-type mud material for improving the working environment, which mud material is capable of increasing the depth of an iron tap hole and of improving the adhesion to mud material deposited in a furnace at high heat, such adhesion being a drawback of the conventional art.

This invention provides a mud material used for an iron tap hole in a blast furnace, wherein 8 to 20 wt % of a solution of a novolak-type phenolic resin having a specific number-average molecular weight and serving as a binder is added to and blended with a refractory aggregate used as a conventional mud material.

12 Claims, 1 Drawing Sheet

MUD MATERIAL USED FOR IRON TAP HOLE IN BLAST FURNACE

TECHNICAL FIELD

The present invention relates to a mud material used for an iron tap hole in a blast furnace.

BACKGROUND ART

In recent years technological innovations, such as increases in the amount of iron discharged because of the larger size of blast furnaces and the operation the furnaces under high pressure, significant decreases in coke ratios due to dust coal and the like being blown in and significantly extended amounts of operating time of blast furnaces, have produced harsh service conditions for a mud material, increasing the demand for higher quality product. In addition, the inherent properties of the mud material demanded have changed since the quality of the environment must be considered.

The mud material needs to have properties for protecting bricks around the iron tap hole on the furnace wall and for improving the working atmosphere, in addition to the conventional properties of corrosion resistance and workability in order to block the iron tap hole and to discharge slag and hot metal.

In various types of existing blast furnaces, there are from one to four iron tap holes in each furnace. Because these iron tap holes are alternately used in the ordinary operation of discharging hot metal, the same iron tap hole is opened and blocked usually at intervals of several hours. In one operating method, only two diagonal iron tap holes are alternately used over one week, and then an iron tap hole out of operation is used. There are times when one iron tap hole is used continuously because of the status of a runner, trouble with a mud gun or the like. In such a case, there are times when the iron tap hole must be blocked or opened for approximately one hour.

From the viewpoint of versatile operation, the properties required for the mud material are as follows:

① The mud material should have an optimum viscosity and plasticity so that the iron tap hole can be easily filled with the mud material by a mud gun;

② The shorter amount of time required to calcine the mud material fed inside the furnace, the better. There should only be a small amount of smoke when the iron tap hole is opened;

③ The sintering strength of the mud material after the material has been calcined should not depend significantly on the amount of calcining time. Opening the iron tap hole should be easy;

④ The mud material should have corrosion resistance with respect to slag and hot metal so that it can be deposited in the furnace for a long period of time. The bore of the iron tap hole should only increase a small amount, and the speed at which iron is discharged can be maintained stably;

⑤ The mud material should have excellent adhesion to old material at high temperatures when it is fed into the furnace. It should have excellent high-earty strength and properties for stabilizing the volume when it is heated rapidly. The mud material should be capable of protecting the wall bricks of the furnace and stably forming and maintaining the depth of the iron tap hole;

⑥ The mud material should not contaminate the working environment.

Grain size and various refractories and binders have been conventionally examined so that mud materials used for an iron tap hole in a blast furnace are provided with the above-mentioned properties. For instance, alumina type material whose main components are high-alumina, electro-molded (or sintered) alumina, silicone carbide, silicone nitride, coke and clay are mainly used in place of a silicate type and low alumina type materials whose main components are chamotte, Roseki, coke and clay. In order to improve the working environment there are presently plans to switch from a coal type tar mainly used as a binder to a petroleum type or a resin type solution.

Problems to be Solved by the Invention

Generally, the life of blast furnaces, even large and high-pressure ones, is aimed at lasting more than 10 to 20 years. In addition, operational innovations are made year by year, and bricks of the blast furnace are required to withstand severe service conditions. The life of blast furnaces in such an environment must be extended. For this reason, not only must the most up-to-date technology be put together when a furnace is constructed, but also, how much the mud material and operational techniques during actual operation of the furnace are improved important for effective production and for increasing the life of the furnace.

One of the most important elements for extending the life of a furnace is to reduce damage to wall bricks in the lower part thereof.

The portion of the wall bricks in the lower part of the furnace which is severely damaged is the portion which suffers local damaged near the molten metal surface, and further, the portion near the iron tap hole through which hot metal and slag are discharged is naturally the most severely damaged.

Thus, it is no exaggeration to say that damage to wall bricks near the iron tap hole in the furnace is the most important factor determining the life of the furnace. A main countermeasure for reducing damage around the iron tap hole is to decrease and inhibit the flow of slag and hot metal in the furnace. As a result, a diffusion effect is inhibited in the interface between the refractory for the furnace and slag and hot metal, and the cooling effect outside the furnace is improved, thereby effectively reducing mechanical damage and the dissolution of the bricks in the lower part of the furnace, which dissolution is caused by a decrease in the reaction speed due to a temperature drop in the interface. The flow of slag and hot metal near the iron tap hole in the furnace is inhibited by increasing the depth of the iron tap hole, and by discharging the slag and hot metal as much as possible from the center of the inside diameter of the furnace.

Thus, the purpose of using the mud material is not only to block the iron tap hole and stably discharge hot metal as performed conventionally, but also to protect the bricks near the iron tap hole in the lower part of the furnace.

Obtaining a long and stable depth of the iron tap hole is to protect the wall bricks on the lower part of the furnace and to decrease the remaining amount of hot metal and slag when they are discharged so that the operation always can be managed at a low level of hot metal in the furnace. It is thus possible to prevent secondary damage when an air flow is suddenly stopped because of a decrease in fluctuations of wind pressure or trouble with a device, thus playing a great role in the stability and safety of the operation.

Although there are improvements in quality and advancements in the present day mud material they cannot achieve, a stable iron tap hole depth that can satisfactorily meet the movement of a substance in the furnace and the rapid down flow of slag and hot metal. Therefore large amounts of mud material are filled, and in terms of equipment the inside diameters of the tuyeres on the upper part of the iron tap hole are reduced, tuyeres are blocked, and the intervals between tuyeres are increased, etc., so as to deal with the movement and the rapid down flow.

When these countermeasures are taken, an increase in the amount of mud material deteriorates the working atmosphere and increases the amount of smoke due to insufficient calcination. Also, when countermeasures are taken for equipment, the balance in the amount of air flow in the furnace is lost, etc., which is undesirable. Therefore, the most important tasks are develop a mud material suitable for blast furnace operating technology, to increase the depth of the iron tap hole, and to improve the environment.

Conventionally, the switch from a coal tar type to a resin type as the binder for a mud material has been proposed for improving the working environment with the aim of reducing smoke, malodors, calcining and operating time, bringing on high-early strength and improving the environment and this has brought about great improvement in the environment surround iron tap hole filling and reduction in operation time. However, other than these advantages, there are disadvantages in that the adhesion of the binder to a red-hot mud material deposited in the furnace is lost since early thermosetting is one of the properties of the mud material, which adhesion is essential for increasing the depth of the iron tap hole. The binder can be effectively used only for closing the iron tap hole, and has an adverse effect on increasing the depth of the iron tap hole. At present such mud material has a significant disadvantage in that it cannot increase the life of the blast furnace by protecting the wall bricks near the iron tap hole in the lower part of the furnace.

Accordingly, the object of the present invention is to develop an innovative mud material which has the properties of a resin-type mud material for improving the working environment, and which is capable of increasing the depth of an iron tap hole and of improving the adhesion to mud material deposited in a furnace at high heat, which adhesion was a drawback of the conventional art.

BRIEF DESCRIPTION OF THE DRAWINGS

In FIG. 1, numeral 1 denotes red-hot coke; 2, mud material; 3, a capsule; 4, a hydraulic cylinder; 5, a jack for setting the cylinder; 6, mud material deposited in the furnace; 7, a device (removable type) for fixing the capsule and hydraulic cylinder; 8, a motor-driven hydraulic pump; 9, a fire grate; 10, an opening for sending compressed air; 11, a thermocouple; and 12, a refractory castable.

MEANS FOR SOLVING THE PROBLEMS

Figure 1:
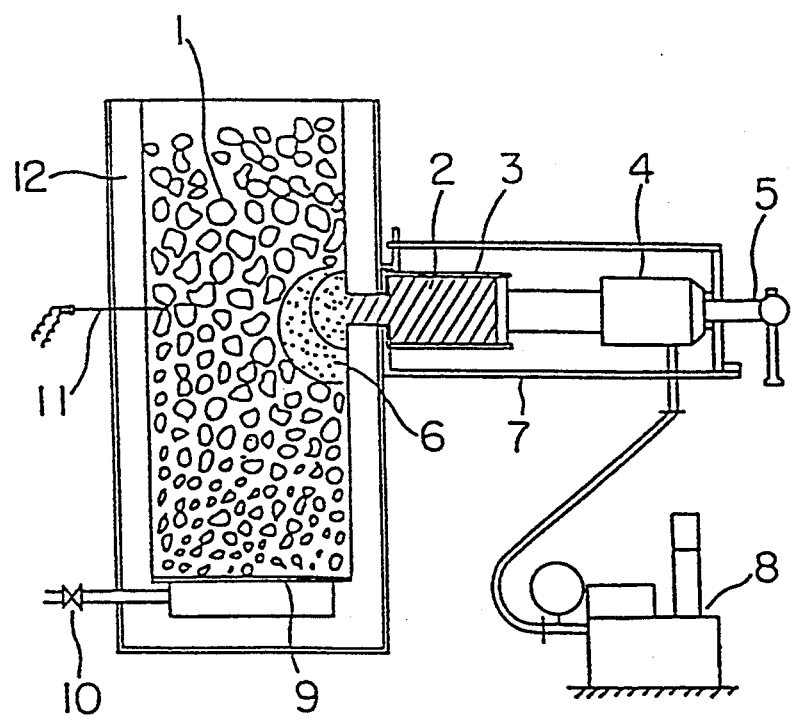
FIG. 1 is a schematic view of an apparatus used in a simulated furnace test for examining properties in the Examples.

Thorough investigation was conducted to solve the above-described problems. As a result, a mud material of this invention used for an iron tap hole in a blast furnace is formed in such a manner that a novolak-type phenolic resin is used in as a binder for a highly refractory and corrosion-resistant aggregate so as to improve the working environment. The properties of the resin are adjusted so as to satisfy all the properties of the mud material described previously. That is, the resin used in this invention has thermosetting properties entirely different from those of a conventionally-known thermosetting method in which the amount of hardener added is adjusted, such as a hexamethylenetetramine or resol type resin. Optimum wettability and thermosetting properties which can only be achieved by the method of this invention are realized by specifying the number-average molecular weight of the resin so as to provide wettability in a hot contact surface with respect to red-hot mud material having thermoplasticity and so as to provide stable composition of the mud material when a volatile substance is thermally expanded or formed into gas due to rapid heating. The resin used in this invention is capable of improving the adhesion at high temperatures, the most critical drawback of the conventional resin type mud material, of increasing the depth of the iron tap hole and of improving the working environment.

This invention relates to a mud material used for an iron tap hole in a blast furnace, in which 8 to 20 wt % of a solution of a novolak-type phenolic resin having a specific number-average molecular weight and serving as a binder is added to and blended with a refractory aggregate used as a conventional mud material formed of electrically-molded alumina, sintered alumina, bauxite, alumina shale, alumina spinel, Roseki, silicone carbide, silicone nitride, a carbon substance, clay, a small amount of metallic powder, etc., the grain size of all components being adjusted.

Operation

The novolak-type phenolic resin used for the mud material of an iron tap hole in a blast furnace has a number-average molecular weight ranging from 300 to 600. In this invention, the resin solution is used as a binder for a refractory aggregate used as an ordinary mud material formed of electrically-molded alumina, sintered alumina, bauxite, alumina shale, alumina spinel, Roseki, silicone carbide, silicone nitride, coke, clay, extremely small powder of silica or alumina, and a small amount of metallic powder for sintering purposes, the grain size of all components being adjusted.

When the number-average weight of the novolak-type phenolic resin is less than 300, the thermosetting of the mud material is retarded. When it is heated rapidly, a volatile substance in the mud material is rapidly and thermally expanded or formed into gas, thus making the composition of the mud material loose and rough, decreasing resistance to wear and melting loss with respect to hot metal and slag, which is not desirable. When the number-average weight is more than 600, the thermosetting of the mud material quickens, thus deteriorating the adhesion of the mud material to other red-hot mud material at high temperature and thus increasing the viscosity of the resin itself. This makes it difficult to continue to knead the mud material and fill it into the furnace. Although it is possible to solve such a problem and for the mud material to have an appropriate viscosity, the proportion of glycols inevitably increases, with the result that the proportion of resin decreases, thus reducing the carbon-binding strength and losing corrosion resistance.

In this invention, the novolak-type phenolic resin having a specific number-average molecular weight as described above is dissolved in a solvent, such as glycols like ethylene glycol and diethylene glycol, or esters like dioctyl phthalate and dibutyl phthalate so as to form a resin solution which is used as the binder.

The amount of the binder, that is, the novolak-type phenolic resin solution used for a refractory aggregate is affected by the capability of the mud gun for feeding the mud material to the iron tap hole, the grain size of the refractory aggregate, the viscosity of the resin solution, etc, and optimally ranges from 8 to 20 wt %. When the amount of the binder added is less than 8 wt %, it is impossible for the mud gun to feed the mud material into the furnace. When it is more than 20 wt %, the amount of volatile substances inevitably increases, thus making the composition of the mud material complicated as the volatile substances form into gas. The corrosion resistance of the mud material is decreased and the stability of volume is lost due to rapid heating, causing an undesirable effect.

It is preferable that the resin content in the liquid resin be within a range from 50 to 70 wt %. When it is less than 50 wt %, the carbon-bonding strength is weak in the initial and middle stages of calcination, thus providing poor durability. When it is more than 70 wt %, the viscosity increases too much, thus increasing the amount of binder added and causing an adverse effect in the same manner as when the binder is added excessively.

Examples

The present invention will be described in more detail with reference to the following examples and comparative examples.

Examples

Table 1 shows the properties of binders, and Table 2 shows the grain size and chemical composition of raw materials used as refractory aggregate. Table 3 shows the blending used for forming the mud materials in the examples and comparative examples, and Table 4 shows the property values of the mud materials.

TABLE 1

| | Number-average molecular weight | Viscosity 40° C. (poise) | Fixed carbon (%) | Solution concentration (%) |
|---|---|---|---|---|
| Novolak-type phenolic resin: R1 | 260 | 40 | 30 | 73 |
| Novolak-type phenolic resin: R2 | 310 | 41 | 31 | 65 |
| Novolak-type phenolic resin: R3 | 450 | 40 | 30 | 60 |
| Novolak-type phenolic resin: R4 | 580 | 41 | 29 | 55 |
| Novolak-type phenolic resin: R5 | 650 | 41 | 28 | 48 |
| Conventional phenolic resin: P3 | 280 | 45 | 38 | 73 |
| Conventional phenolic resin: P7 | 280 | 45 | 41 | 73 |

TABLE 1-continued

| | Number-average molecular weight | Viscosity 40° C. (poise) | Fixed carbon (%) | Solution concentration (%) |
|---|---|---|---|---|
| Coal type tar (JIS #2) | — | 12 | 30 | — |

Note:
1)The solution concentration indicates resin content (wt %) when various resins are dissolved in ethylene glycol.
2)The conventional phenolic resins P3 and P7 indicate the amount of added hexamethylenetetramine used as a thermosetting promotor. "P3" refers to 3 wt % and "P7" refers to 7 wt % in terms of outer percentage with respect to the resin solution.

TABLE 2

| | Grain size (mm) | Chemical composition (wt %) | | | | | |
|---|---|---|---|---|---|---|---|
| | | $Al_2O_3$ | $SiO_2$ | SiC | $Si_3N_4$ | Fixed Carbon | Si |
| Electrically-molded alumina: A1 | 3-1 | 99.6 | | | | | |
| Electrically-molded alumina: A2 | 1> | 99.6 | | | | | |
| Electrically-molded alumina: A3 | 0.075> | 98.5 | | | | | |
| Sintered alumina: A4 | 7-1 | 99.7 | | | | | |
| Bauxite: B1 | 3-1 | 90.5 | 6.2 | | | | |
| Bauxite: B2 | 1> | 90.5 | 6.2 | | | | |
| Roseki: C1 | 3-1 | 20.1 | 75.2 | | | | |
| Roseki: C2 | 1> | 20.1 | 75.2 | | | | |
| Coke | 2> | | | | | 89.3 | |
| Silicon carbide: D1 | 3> | | | 83.5 | | 7.9 | |
| Silicon carbide: D2 | 0.075> | | | 87.7 | | 4.1 | |
| Silicon nitride | 0.75> | | | | 97.6 | | |
| Refractory clay | 0.7 | 34.2 | 54.4 | | | | |
| Silica flour | average grain size 0.5 μm | | 92.3 | | | | |
| Metallic silicone | 0.075> | | | | | | 98.3 |
| Coal pitch | 1> | | | | | 53.1 | |

TABLE 3-1

| | (wt %) Examples | | | | | | |
|---|---|---|---|---|---|---|---|
| | 1 | 2 | 3 | 4 | 5 | 6 | 7 |
| Electrically-molded alumina: A1 | 15 | 15 | 15 | 15 | 9 | | |
| Electrically-molded alumina: A2 | 10 | 10 | 10 | 11 | 6 | | |
| Electrically-molded alumina: A3 | 11 | 11 | 11 | 12 | 7 | | |
| Sintered alumina: A4 | | | | | 38 | | |
| Bauxite: B1 | | | | | | 10 | |
| Bauxite: B2 | | | | | | 15 | |
| Roseki: C1 | | | | | | | 10 |
| Roseki: C2 | | | | | | | 10 |
| Coke | 10 | 10 | 10 | 11 | 6 | 15 | 20 |

TABLE 3-1-continued

| | (wt %) Examples | | | | | | |
|---|---|---|---|---|---|---|---|
| | 1 | 2 | 3 | 4 | 5 | 6 | 7 |
| Silicon carbide: D1 | 5 | 5 | 5 | 5 | 3 | 5 | 5 |
| Silicon carbide: D2 | 12 | 12 | 12 | 13 | 7 | 12 | 12 |
| Silicon nitride | 10 | 10 | 10 | 11 | 6 | 10 | 8 |
| Refractory clay | 8 | 8 | 8 | | 5 | 12 | 15 |
| Silica flour | | | | 6 | | | |
| Metallic silicone | 2 | 2 | 2 | 2 | 2 | 2 | |
| Coal pitch | 2 | 2 | 2 | 2 | 2 | 2 | 2 |
| Phenolic resin: R1 | | | | | | | |
| Phenolic resin: R2 | 15 | | | | | | |
| Phenolic resin: R3 | | 15 | | 11 | 9 | 17 | 18 |
| Phenolic resin: R4 | | | 15 | | | | |
| Phenolic resin: R5 | | | | | | | |
| Phenolic resin: P3 | | | | | 15 | | |
| Phenolic resin: P7 | | | | | | | |
| Coal type tar | | | | | | | |

TABLE 3-2

| | (wt %) Comparative Examples | | | | | |
|---|---|---|---|---|---|---|
| | 8 | 9 | 10 | 11 | 12 | 13 |
| Electrically-molded alumina: A1 | 15 | 15 | 15 | 15 | 14 | |
| Electrically-molded alumina: A2 | 10 | 10 | 10 | 10 | 10 | |
| Electrically-molded alumina: A3 | 11 | 11 | 11 | 11 | 11 | |
| Sintered alumina: A4 | | | | | | |
| Bauxite: B1 | | | | | | |
| Bauxite: B2 | | | | | | |
| Roseki: C1 | | | | | | 10 |
| Roseki: C2 | | | | | | 10 |
| Coke | 10 | 10 | 10 | 10 | 10 | 19 |
| Silicon carbide: D1 | 5 | 5 | 5 | 5 | 5 | 5 |
| Silicon carbide: D2 | 12 | 12 | 12 | 12 | 12 | 12 |
| Silicon nitride | 10 | 10 | 10 | 10 | 10 | 8 |
| Refractory clay | 8 | 8 | 8 | 8 | 8 | 15 |
| Silica flour | | | | | | |
| Metallic silicone | 2 | 2 | 2 | 2 | 2 | |
| Coal pitch | 2 | 2 | 2 | 2 | 2 | 2 |
| Phenolic resin: R1 | 15 | | | | | |
| Phenolic resin: R2 | | | | | | |
| Phenolic resin: R3 | | | | | | |
| Phenolic resin: R4 | | | | | | |
| Phenolic resin: R5 | | 15 | | | | |
| Phenolic resin: P3 | | | 15 | | | |
| Phenolic resin: P7 | | | | 15 | | |
| Coal type tar | | | | | 16 | 19 |

A heat-type mixer was used to thoroughly knead a binder at the blending ratio shown in Table 3 while a kneading temperature was maintained at 30° to 40° C. when the binder was a resin type and at 40° to 50° C. when it was a tar type so as to form a green material.

The physical property values shown in Table 4 are the values obtained when the green material was formed, using a molding pressure of 150 kgf/cm², into a 35×35×140 mm test specimen. The method of conducting a test for comparing the various properties shown in Table 4 will be described below.

① Comparison of corrosion resistance *1: The mud material was placed in a high-frequency induction furnace at 1550° C. for 3 hours. 10 kg of pig iron and 300 g of blast furnace slag, both serving as a corrosion agent, were alternately fed 6 times to compare corrosion depth. Durability was compared using an index.

② Hot metal immersion test *2: A green material which had already been heated to 60° C. was placed in a 100×100×200 mm mold, and was struck by an air hammer until it had a uniform structure. A hole having a size of 11 mmφ was formed at the center of one short side of a metallic flask. The metallic flask was shaped while a metal bar having a 10 mmφ×200 mm core was inserted into the center of the specimen. 5 mmφ×40 mm wires serving as studs were attached 50 mm from one end of the metal bar, and to the same end thereof. The specimen was then fixed to one end of an iron pipe and dipped for 1 minute into hot metal (1500° C.) in the main runner skimmer of a blast furnace so that approximately 100 mm of the iron pipe was immersed in the hot metal.

③ Simulated furnace test *3: The simulated furnace shown in FIG. 1 was filled with coke particle (30 to 10 mm). The coke inside the furnace was burnt by air blown from the lower part of the furnace. While the coke temperature was maintained at approximately 1500° C., 1.0 kg of green material was fed into the furnace by a hydraulic cylinder through a nozzle having a bore of 20 mmφ. A capsule for filling purposes was removed immediately, and a fill opening was opened by a 20 mmφ concrete drill. Then 10 minutes after the first filling was performed, another 1.0 kg of green material was fed into the furnace a second time. The same operation as described above was performed to feed the green material three times. After 20 minutes had elapsed, the fire was extinguished. After cooling had been performed by an oxidation-inhibiting method, the furnace was vertically divided into two so that the coke was removed. The sample was then collected. The above operation was performed for each compound, and the adhesion status of the compounds was compared.

④ Electric arc furnace heat test *4: A mud material which had not yet been calcined and another red-hot calcined mud material were brought into contact with each other. Thereafter, while both mud materials were joined together, they were subjected to heat treatment at 300° C. for 10 hours. Then, the modulus of rupture thereof was measured and compared by a bending test conducted in the following manner. First, the green material was formed, using a molding pressure of 150 kgf/cm² into two 40×40×80 mm cubes. A dividable outer frame formed of thermal insulating brick was formed for one cube. The size of the outer frame was 40×40×200 mm. The mud material which had not yet been calcined was placed in the outer frame. The other mud material was calcined at 1500° C. for 3 hours in a neutral atmosphere of an electric furnace where there was no oxygen. The red-hot mud material was then quickly taken out with tongs and placed in the above-described thermal insulating outer frame. The red-hot mud material was allowed to stand to cool while a load of 3 kgf/cm² was being applied thereto. Then, while the calcined mud material and the mud material which had not yet been calcined were joined together, they were subjected to heat treatment at 300° C. for 10 hours. The mud material which had not yet been calcined was thermoset, and then the bending strength thereof was compared. ⑤ Thermosetting speed *5: A plate (9 mm×350 mm×350 mm) was placed on a 300 mmφ spiral electric heater having a capability of 2 kW. The surface temperature of the plate was maintained at 500° C. A mud material was formed, using a molding pressure of 150 kgf/cm², into a 50 mmφ×50 mm briquette, and then the briquette was placed on the plate. The amount of time it took for the upper part of the briquette to be thermoset was measured, this amount of time being regarded as the thermosetting speed, and compared. ⑥ Flaming duration *6: A green material made of the mud material was formed, using a molding pressure of 150 kgf/cm², into a 30 mmφ×30 mm test specimen. The test specimen was then introduced into the electric arc furnace where the temperature was maintained at 1000° C., and then the amount of time it took for the flame to be extinguished was compared.

of the iron tap hole increased by 36 cm from 339 cm to 375 cm, 339 cm being the value when the product of Comparative Example 12 was used. It was found out that even when the amount of mud material fed per tap was reduced by 30%, tap hole depth similar to as that obtained when the conventional mud material was used, could be obtained. It was proved that the mud material of this invention has excellent adhesion to red-hot mud material at high temperatures. Also, when the amount of mud material fed is appropriately selected, it is easy to protect bricks near the iron tap hole.

TABLE 4

|  | Examples | | | | | | | Comparison Examples | | | | | |
| --- | --- | --- | --- | --- | --- | --- | --- | --- | --- | --- | --- | --- | --- |
|  | 1 | 2 | 3 | 4 | 5 | 6 | 7 | 8 | 9 | 10 | 11 | 12 | 13 |
| Filling property [Marshall value (kg/cm²)] 45° C. | 17 | 17 | 17 | 18 | 18 | 17 | 16 | 16 | 17 | 17 | 17 | 31 | 30 |
| Change rate (%) for residual line after heat treatment at 300° C. for 10 hrs | −0.2 | −0.1 | −0.2 | −0.1 | −0.1 | −0.2 | −0.3 | −0.2 | −0.4 | −0.5 | −0.7 | +0.1 | +0.1 |
| Bulk specific gravity | 2.19 | 2.20 | 2.18 | 2.24 | 2.42 | 2.07 | 1.91 | 2.19 | 2.18 | 2.18 | 2.17 | 2.09 | 1.92 |
| Apparent porosity (%) | 14.4 | 14.1 | 13.7 | 13.3 | 12.5 | 14.8 | 15.4 | 14.3 | 13.6 | 14.1 | 14.9 | 9.1 | 9.0 |
| Modulus of rupture (kgf/cm²) | 91 | 105 | 112 | 108 | 106 | 101 | 104 | 86 | 115 | 127 | 155 | 48 | 43 |
| Change rate (%) for residual line after heat treatment at 1500° C. for 3 hrs | −0.4 | −0.5 | −0.4 | −0.3 | −0.2 | −0.5 | −0.2 | −0.3 | −0.7 | −0.8 | −1.2 | +0.2 | +0.6 |
| Bulk specific gravity | 2.16 | 2.17 | 2.16 | 2.19 | 2.39 | 2.04 | 1.79 | 2.15 | 2.14 | 2.13 | 2.12 | 2.00 | 1.80 |
| Apparent porosity (%) | 28.0 | 27.8 | 28.1 | 27.9 | 26.3 | 28.0 | 28.8 | 28.1 | 28.4 | 29.2 | 30.5 | 28.7 | 29.3 |
| Modulus of rupture (kgf/cm²) | 71 | 87 | 84 | 89 | 85 | 78 | 73 | 70 | 85 | 66 | 58 | 71 | 68 |
| Comparison of corrosion resistance*1 | 83 | 85 | 84 | 88 | 100 | 76 | 65 | 79 | 78 | 77 | 74 | 75 | 63 |
| Hot metal immersion test*2 remaining weight ratio (%) | 91 | 90 | 91 | 92 | 94 | 88 | 85 | 79 | 87 | 88 | 90 | 75 | 72 |
| Cracks in structure | ○ | ○ | ○ | ○ | ○ | ○ | ○ | Δ | Δ | X | X | X | X |
| Apparent porosity (%) | 14.8 | 15.1 | 15.2 | 14.9 | 12.7 | 15.5 | 15.8 | 15.8 | 16.7 | 17.3 | 18.5 | 14.8 | 15.3 |
| Simulated furnace test*3 Adhesion comparison | ○ | ⊙ | ○ | ⊙ | ⊙ | ⊙ | ○ | Δ | Δ | X | X | ○ | ○ |
| Electric furnace heat test*4 Adhesion strength (Modulus of rupture (kgf/cm²) | 33 | 35 | 32 | 37 | 28 | 34 | 31 | 21 | 11 | 6 | 2 | 13 | 10 |
| Thermosetting speed (mm/min)*5 | 0.50 | 0.57 | 0.65 | 0.60 | 0.63 | 0.54 | 0.51 | 0.42 | 0.76 | 1.18 | 1.98 | 0.62 | 0.60 |
| Flaming duration (sec)*6 | 58 | 55 | 52 | 54 | 41 | 56 | 58 | 60 | 50 | 49 | 46 | 244 | 261 |

Note: Symbols used in Table 4 mean the following:
1)Cracks in the structure
○ indicates no cracks,
Δ indicates fine cracks and
X indicates annular cracks.
2)Comparison of adhesion properties*3 (The joining status of the filler material fed three times into the furnace at intervals of 10 minutes.)
⊙ indicates that three charges of the filler material were integrally joined together.
○ indicates that the three charges were substantially joined together and could be distinguished by visual observation.
Δ indicates respective parts of the three charges were joined together and decomposed when they were touched.
X indicates that the three charges were not joined together and were separate from each other.

Note:

A mud material according to Example 2, which was a product of this invention, was tested in a large high-pressure blast furnace (having a volume of 4550 m³). As a result, the depth of the iron tap hole was 339 cm when a mud material according to Comparative Example 12, which was a conventional product, was used, whereas it was 354 cm when the product of this invention was used. Thus, the depth of the iron tap hole increased by an average value for 10 service days (one campaign). The amount of time required for discharging hot metal was 150 minutes when the conventional product was used, and it was 154 minutes when the product of this invention was used. The amount of time required for holding the mud gun was 25 minutes when the conventional product was used, whereas it decreased to 7 minutes when the product of this invention was used. The problem of graphite being generated when the mud material was handled and other problems were solved, thus markedly improving the working environment.

Moreover, it was possible to develop an innovative mud material which had the following advantages. When the mud material of this invention was continuously tested for as long a period as 1 month, the depth Advantages of the Invention The mud material of this invention used for an iron tap hole in a blast furnace has excellent properties. This is made possible by specifying the number-average molecular weight of resin so that the mud material has proper thermosetting properties. Thus, the adhesion of the mud material to another red-hot mud material in the furnace is improved and the structure of the material is prevented from becoming loose and rough and from decomposing when volatile substances in the mud material are quickly formed into gas as it is heated rapidly. Furthermore, it is possible to increase and stably maintain the depth of the iron tap hole, to improve the working atmosphere and to greatly reduce the amount of time required for opening or blocking the tap hole. Hot metal can be discharged smoothly in every operation. Furthermore, bricks in the lower part of the blast furnace are protected, thus extending the service life of the furnace. This invention may not only be applied to block iron tap holes in blast furnaces, but may also be used as a blocking material for tap holes in electric arc furnaces and gates for discharging molten metal.

What is claimed is:

1. A mud material used for an iron tap hole in a blast furnace containing a refractory aggregate used for conventional mud material and a binder, wherein said binder is a solution consisting of a novolak phenolic resin including novolak phenolic resin having a number-average molecular weight ranging from 300 to 600 and a solvent, and having a resin content in the liquid ranging from 50 to 70 wt. %, and wherein said solution is added in an amount of from 8 to 20 wt. % based on the refractory aggregate.

2. A mud material as claimed in claim 1, wherein said solvent is a glycol selected from glycols or esters.

3. A mud material as claimed in claim 2, wherein said solvent is a glycol selected from ethylene glycol or diethylene glycol.

4. A mud material as claimed in claim 2, wherein said solvent is an ester selected from dioctyl phthalate or dibutyl phthalate.

5. A mud material as claimed in claim 1, wherein said refractory aggregate includes electrically-molded alumina.

6. A mud material as claimed in claim 2, wherein said binder consists of said novolak resin and said solvent.

7. A mud material used for an iron tap hole in a blast furnace containing a refractory aggregate used for conventional mud material and a binder, wherein said binder is a solution consisting of a novolak phenolic resin including novolak phenolic resin having a number-average molecular weight ranging from 300 to 450 and a solvent, and having a resin content in the liquid ranging from 50 to 70 wt. %, and wherein said solution is added in an amount of from 8 to 20 wt. % based on the refractory aggregate.

8. A mud material as claimed in claim 7, wherein said solvent is selected from glycols or esters.

9. A mud material as claimed in claim 8, wherein said solvent is a glycol selected from ethylene glycol or diethylene glycol.

10. A mud material as claimed in claim 8, wherein said solvent is an ester selected from dioctyl phthalate or dibutyl phthalate.

11. A mud material as claimed in claim 7, wherein said refractory aggregate includes electrically-molded alumina.

12. A mud material as claimed in claim 8, wherein said binder consists of said novolak resin and said solvent.

* * * * *